US011325203B2

(12) United States Patent
Weigl

(10) Patent No.: US 11,325,203 B2
(45) Date of Patent: May 10, 2022

(54) DEVICE AND METHOD FOR AVOIDING AN INTERRUPTION IN THE WELDING PROCESS DURING FRICTION STIR WELDING, IN PARTICULAR BREAKAGE OF THE FRICTION PIN

(71) Applicant: Grenzebach Maschinenbau GmbH, Asbach-Baeumenheim (DE)

(72) Inventor: Markus Weigl, Donauwoerth (DE)

( * ) Notice: Subject to any disclaimer, the term of this patent is extended or adjusted under 35 U.S.C. 154(b) by 0 days.

(21) Appl. No.: 16/976,065

(22) PCT Filed: Feb. 22, 2019

(86) PCT No.: PCT/DE2019/000044
§ 371 (c)(1),
(2) Date: Aug. 26, 2020

(87) PCT Pub. No.: WO2019/170182
PCT Pub. Date: Sep. 12, 2019

(65) Prior Publication Data

US 2020/0406390 A1 Dec. 31, 2020

(30) Foreign Application Priority Data

Mar. 6, 2018 (DE) .................... 10 2018 001 774.6

(51) Int. Cl.
*B23K 20/12* (2006.01)

(52) U.S. Cl.
CPC .................................. *B23K 20/123* (2013.01)

(58) Field of Classification Search
CPC .. B23K 20/123; B23K 20/121; B23K 20/128; B23K 20/1245; B23K 20/1255;
(Continued)

(56) References Cited

U.S. PATENT DOCUMENTS 8,100,311 B2 1/2012 Ostersehlte
10,293,430 B2 * 5/2019 Weigl .................. B23K 20/121
(Continued)

FOREIGN PATENT DOCUMENTS

CN 104439691 3/2015
CN 105834577 8/2016
(Continued)

*Primary Examiner* — Erin B Saad
(74) *Attorney, Agent, or Firm* — Duane Morris LLP; Gregory M. Lefkowitz

(57) ABSTRACT

The invention relates to a device and method for avoiding an interruption in the welding process during friction stir welding, in particular breakage of the friction pin, wherein the device has: g) at least three strip-like sensors (8), oriented at an angle of 120 degrees to one another, on the long sides of a wedge-shaped tool dome (7), wherein the tool dome (7) guides a welding pin (19) by means of a tool receiving cone (28) and a welding shoe (11), and the sensors (8) are configured to determined force, pressure and travel, h) a conical evaluation means in the lower region of the tool receiving cone (28), which serves to receive a sensor (22) for sensing the axial force, the torque and the bending moment on the welding pin (19), i) a piezoelectric vertical adjustment means for the welding pin (19), j) an arrangement of a laser measuring sensor (10) in the region of the welding shoe (11), the directivity of which passes over a round hole (27) in the passage region of the pin tip (12), wherein an airborne noise sensor (3) is arranged opposite the laser measuring sensor (10) and a welding shoe temperature sensor is provided, k) a sensor signal amplifier (23) having a rotor antenna for receiving, amplifying and passing on all sensed measured values, wherein these measured values are passed on to a machine controller by a static antenna (16), l) an inductive power supply system for supplying the measuring system from a moving secondary winding (24) and a stationary primary winding (25).

6 Claims, 6 Drawing Sheets

Figure 1:
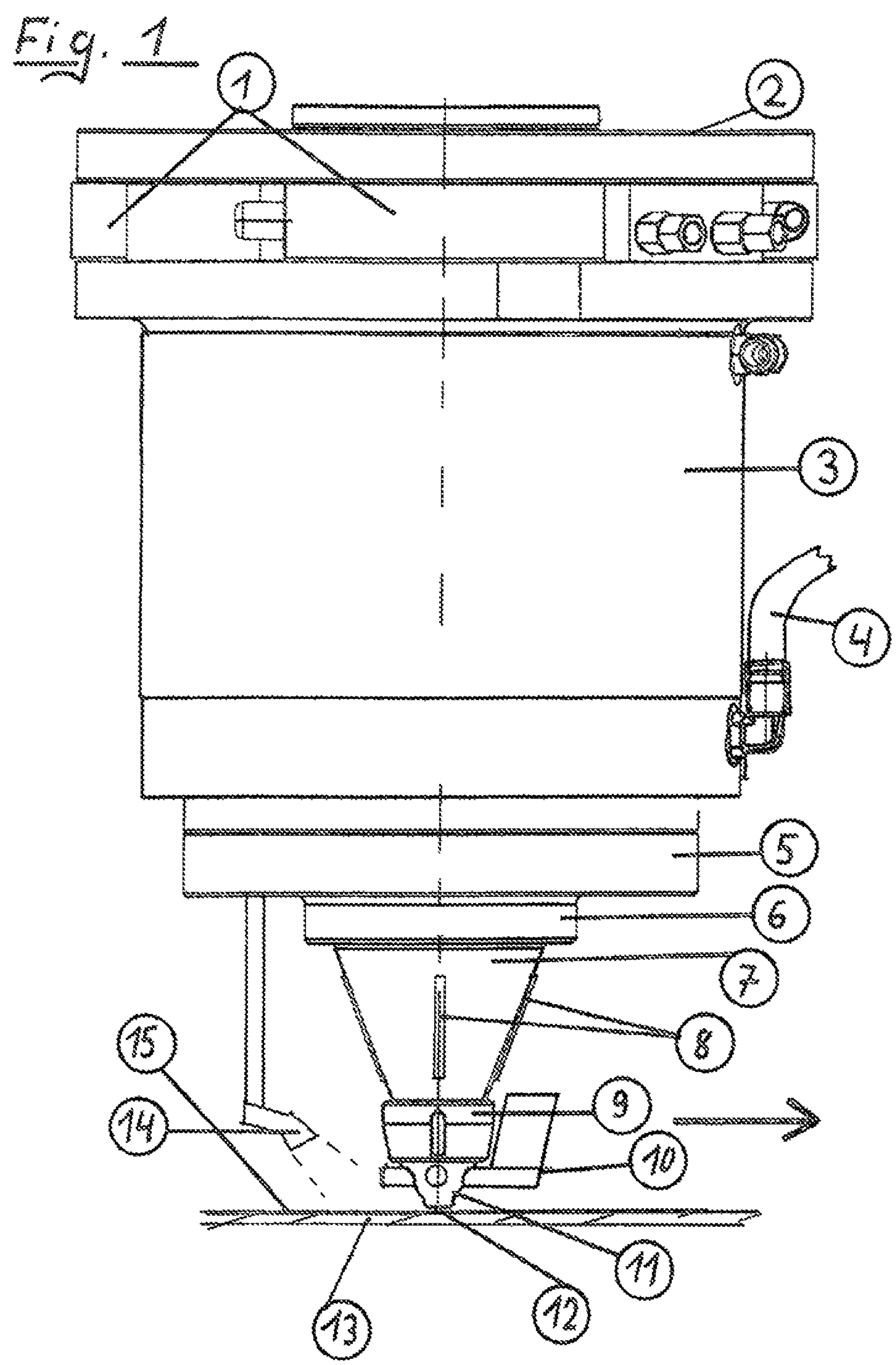

6
7
8
28
16
24
25
23
17
22
18
29
10
9
30
19
11
14
20
21
12

(58) Field of Classification Search

CPC . B23K 20/129; B23K 11/0026; B23K 11/115; B23K 11/3009; B23K 11/314; B23K 11/315; B23K 11/36; B23K 20/1235; B23K 20/125; B23K 20/126; B23K 20/1265; B23K 2101/04; B23K 2103/08; B23K 37/0276

See application file for complete search history.

(56) References Cited

U.S. PATENT DOCUMENTS

| | | | | |
|---|---|---|---|---|
| 2008/0073409 | A1 | 3/2008 | Ostersehlte | |
| 2016/0318120 | A1 | 11/2016 | Okada et al. | |
| 2016/0346869 | A1* | 12/2016 | Weigl | B23K 20/1245 |
| 2018/0193943 | A1* | 7/2018 | Weigl | G01L 1/162 |
| 2018/0221987 | A1* | 8/2018 | Weigl | B23K 20/129 |
| 2018/0236590 | A1* | 8/2018 | Weigl | B23K 11/315 |
| 2020/0353559 | A1* | 11/2020 | Weigl | B23K 20/1245 |
| 2020/0376590 | A1 | 12/2020 | Weigl | |

FOREIGN PATENT DOCUMENTS

| | | |
|---|---|---|
| CN | 106141420 | 11/2016 |
| DE | 102014005315 | 6/2015 |
| DE | 102016000880 | 5/2017 |
| EP | 2965858 | 1/2016 |
| WO | 2007006669 | 1/2007 |

* cited by examiner 1
2
3
4
5
6
7
8
9
10
11
12
13
14
15

10
11
19
31
29
12
27
30
26

26
8
10
7
11
19
29
31
12
8a
8b
30
32
33
34
35 a b

DEVICE AND METHOD FOR AVOIDING AN INTERRUPTION IN THE WELDING PROCESS DURING FRICTION STIR WELDING, IN PARTICULAR BREAKAGE OF THE FRICTION PIN

CROSS-REFERENCE TO RELATED APPLICATIONS

This application is a § 371 national stage entry of International Application No. PCT/DE2019/000044, filed on Feb. 22, 2019, which claims priority to German Patent Application No. 10 2018 001 774.6, filed Mar. 6, 2018, the entire contents of which are incorporated herein by reference.

At the beginning of the nineties of the last century, friction stir welding was developed. In the meantime, friction stir welding is being successfully used among other things for the welding of aluminum alloys in many areas of industry.

The applications range here from one-off pieces and small batches through to larger batches. Apart from the outstanding quality of the weld seam, other factors contributing to the commercial success are the high degree of reproducibility and the little preparational work and expenditure on finishing.

In friction stir welding, frictional heat is generated in the joining region of the materials to be connected by means of the friction between a rotating tool which at the same time is moved translationally and to which pressure is applied. The tool is moved along the joining region and stirs the plastified material in the interior of the seam of the materials to be connected that are butting against one another. The applied pressure presses the plastified material together. At the end of the weld seam created, the tool is withdrawn from the region of the connection and the weld seam can be subjected to loading immediately.

For prior art, reference is made to DE 10 2014 005 315 B3, originating from the applicant.

This concerns a method and a device for detecting the mechanical forces at the welding pin tip during the operation of friction stir welding and also a computer program and a machine-readable carrier with a program for carrying out the method.

The invention provided there is based on the object of optimizing the welding operation during friction stir welding in such a way that the decisive process parameters, such as the axial force of the tool occurring, the torque occurring and the temperature of the welding pin tip can be detected exactly, even in 3D applications.

According to patent claim 1, to achieve this object, it is a matter of optimizing a device for detecting the mechanical forces at the welding pin tip during the operation of friction stir welding in such a way that the decisive process parameters, a) a strip-like sensor (3) on a longitudinal side of a tool dome (9), holding a welding pin pin (12) by way of a pin shaft (13) by means of a tool receiving cone (14) and a, a welding shoe (1), the sensor (3) being designed for determining force, pressure or travel and being mounted on the side of the tool dome (9) that is counter to the direction of flow of the welding process, b) a cone constriction (20) in the wide region of the tool receiving cone (14), which serves for receiving a sensor (18) for detecting the axial force, the torque and the bending moment at the welding pin pin (12), c) a further constriction in the front region of the tool receiving cone (14), with at least three sensors (24), distributed at intervals of 120 degrees at the circumference, and a piezoelectric force measuring sensor (25) in the longitudinal axis of the pin shaft (13), d) a sensor signal amplifier, with a rotor antenna (19) for receiving, amplifying and passing on all of the measured values detected, these measured values being passed on to a machine controller by a static antenna (17), e) an inductive power supply system for supplying the measuring system from a moving, secondary winding (22) and a fixed, primary winding (23).

However, breakages of friction pins can occur during the operation of systems for friction stir welding as a result of local changes in the material within welding assemblies, for example due to variations in hardness in the case of cast materials.

The present invention is therefore based on the object of ensuring the commercial operation of a system for friction stir welding and avoiding breakage of the friction pin within the welding process.

This object is achieved by the features in patent claim 1 a device for avoiding an interruption of the welding process during friction stir welding, in particular breakage of the friction pin, with the following features:

a) at least three strip-like sensors (8), oriented at an angle of 120 degrees to one another, on the longitudinal sides of a wedge-shaped tool dome (7), the tool dome (7) guiding a welding pin (19) by means of a tool receiving cone (28) and a welding shoe (11), and the sensors (8) being designed for determining force, pressure and travel, b) a cone constriction in the lower region of the tool receiving cone (28), which serves for receiving a sensor (22) for detecting the axial force, the torque and the bending moment at the welding pin (19), c) a piezo vertical adjustment for the welding pin (19), d) an arrangement of a laser measuring sensor (10) in the region of the welding shoe (11), the directional effect of which passes over a round hole (27) in the passing-through region of the pin tip (12), an airborne sound sensor (3) being arranged opposite the laser measuring sensor (10), and a welding shoe temperature sensor being provided, e) a sensor signal amplifier (23), with a rotor antenna for receiving, amplifying and passing on all of the measured values detected, these measured values being passed on to a machine controller by a static antenna (16), f) an inductive power supply system for supplying the measuring system from a moving secondary winding (24) and a fixed primary winding (25). It is also claimed that a structure-borne sound sensor (29), which is directed with its directional effect into the region between the welding pin 19 and the welding shoe 11, is installed in the region of the upper end of the union nut (9) and that an eddy current sensor 31 is used for measuring extremely small distances, this sensor being arranged transversely to the welding direction, and that a temperature sensor is provided for detecting the temperature of the welding shoe 11.

And the method according to patent claim 5. A method for avoiding an interruption of the welding process during friction stir welding, in particular breakage of the friction pin, with the following features:

a) a system of strip-like sensors (8) for determining force, pressure and travel of a rotating tool dome (7), guiding a welding pin (19), is supported by a cone constriction in the lower region of a tool receiving cone (28), which serves for detecting the axial force, the torque and the bending moment at a welding pin (19), b) sensors for detecting the bending and the temperature of the welding pin (19) provide information about the state of the welding pin (19) in good time before any damage.

The device according to the invention is described in more detail below: Specifically:

FIG. 1: shows a side view of a system for friction stir welding

Figure 2:
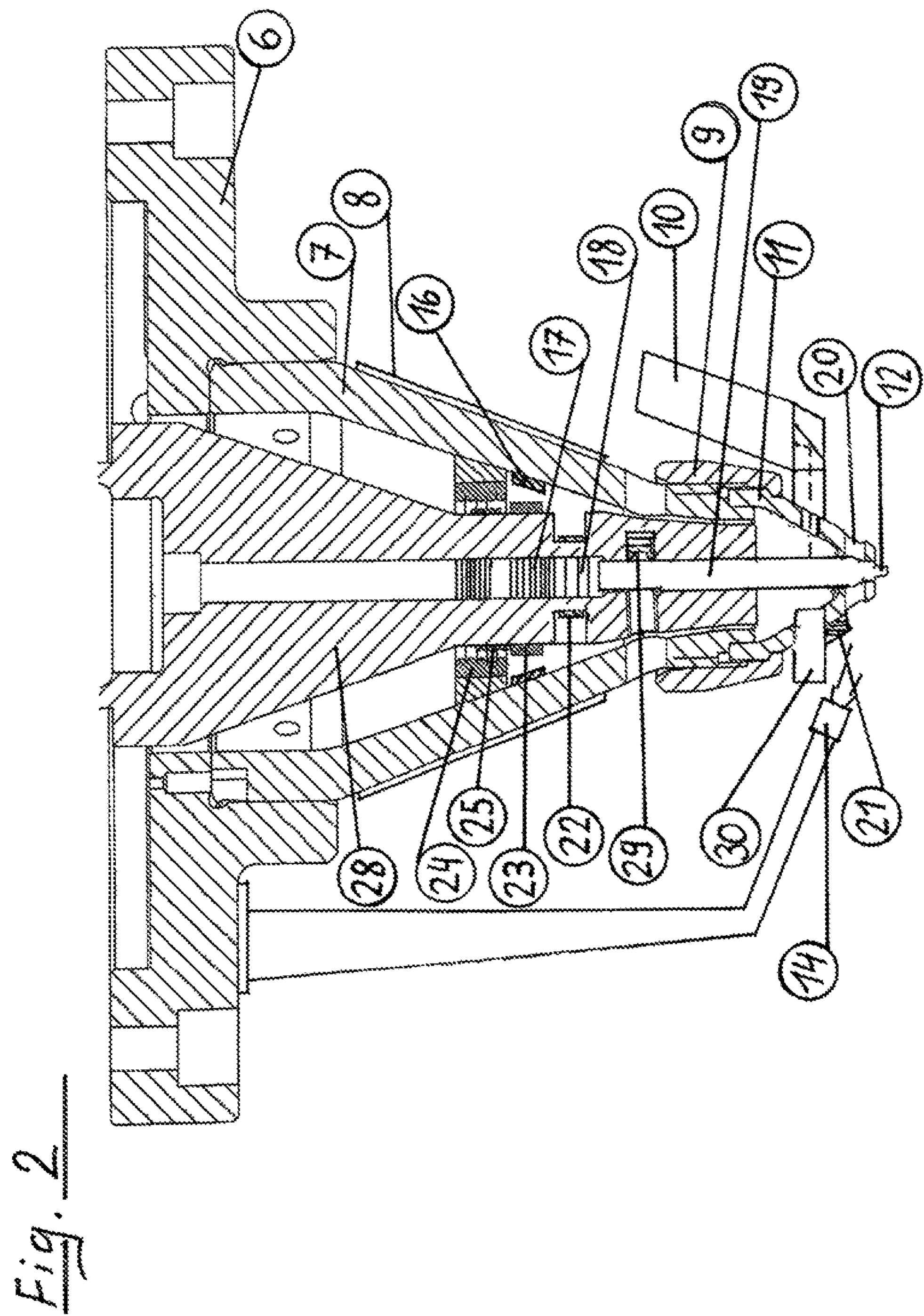
Figure 3:
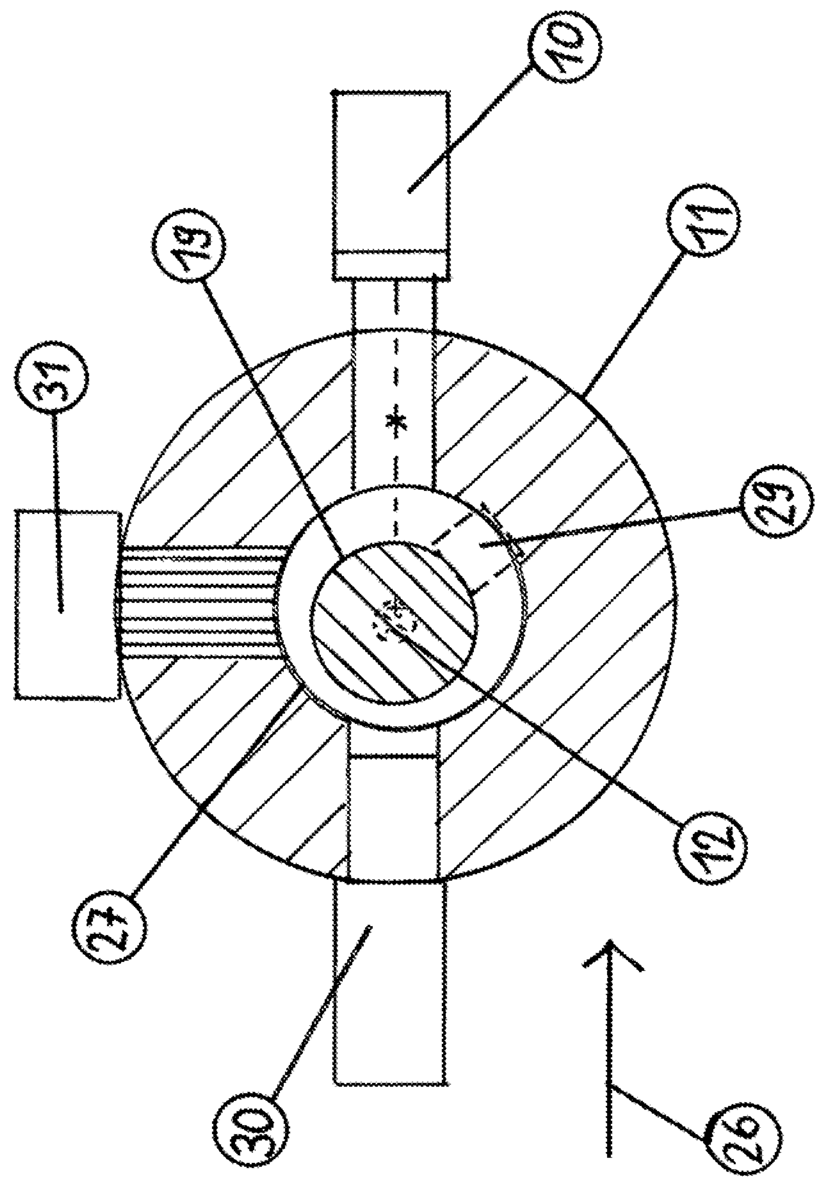
Figure 4:
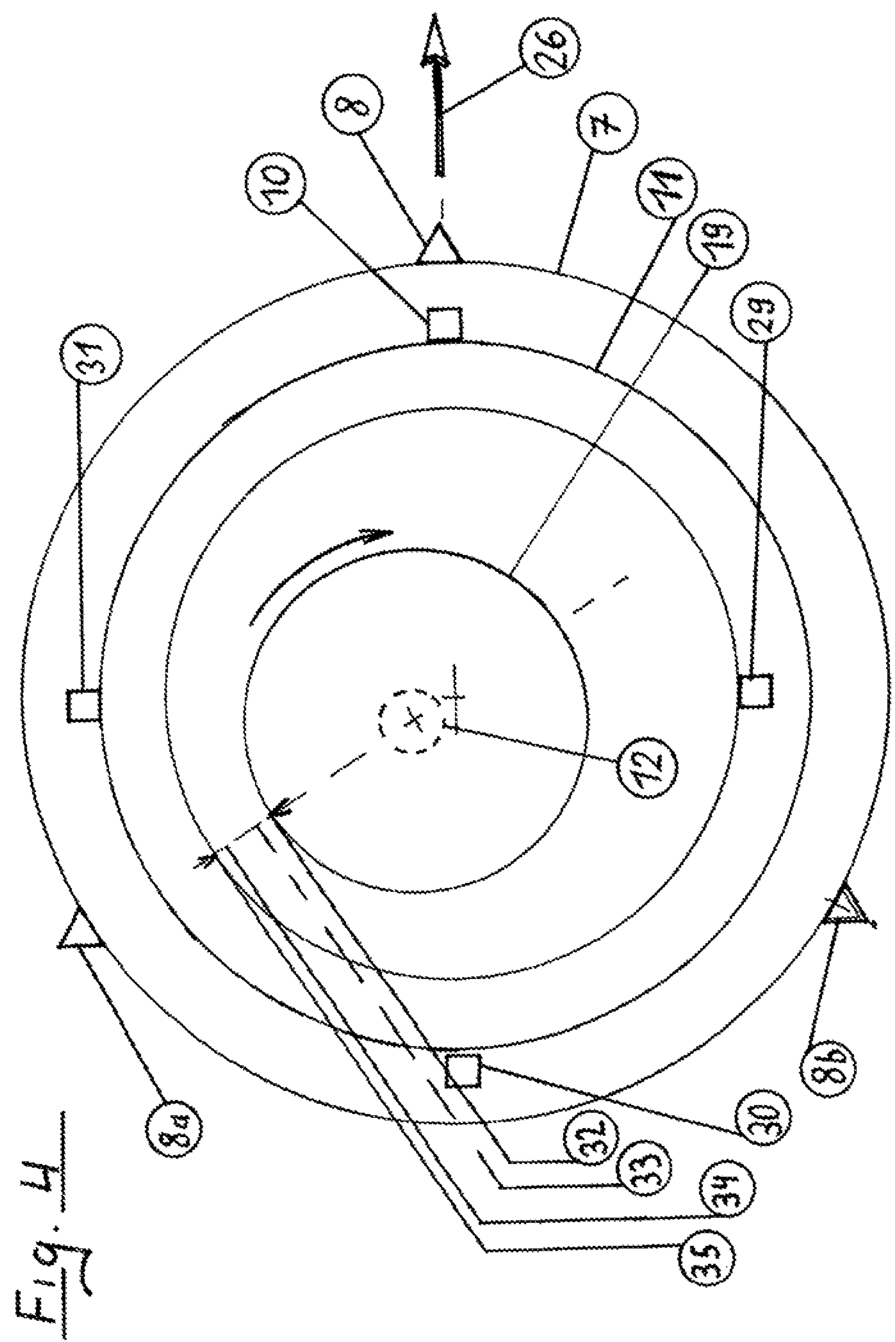
Figure 5:
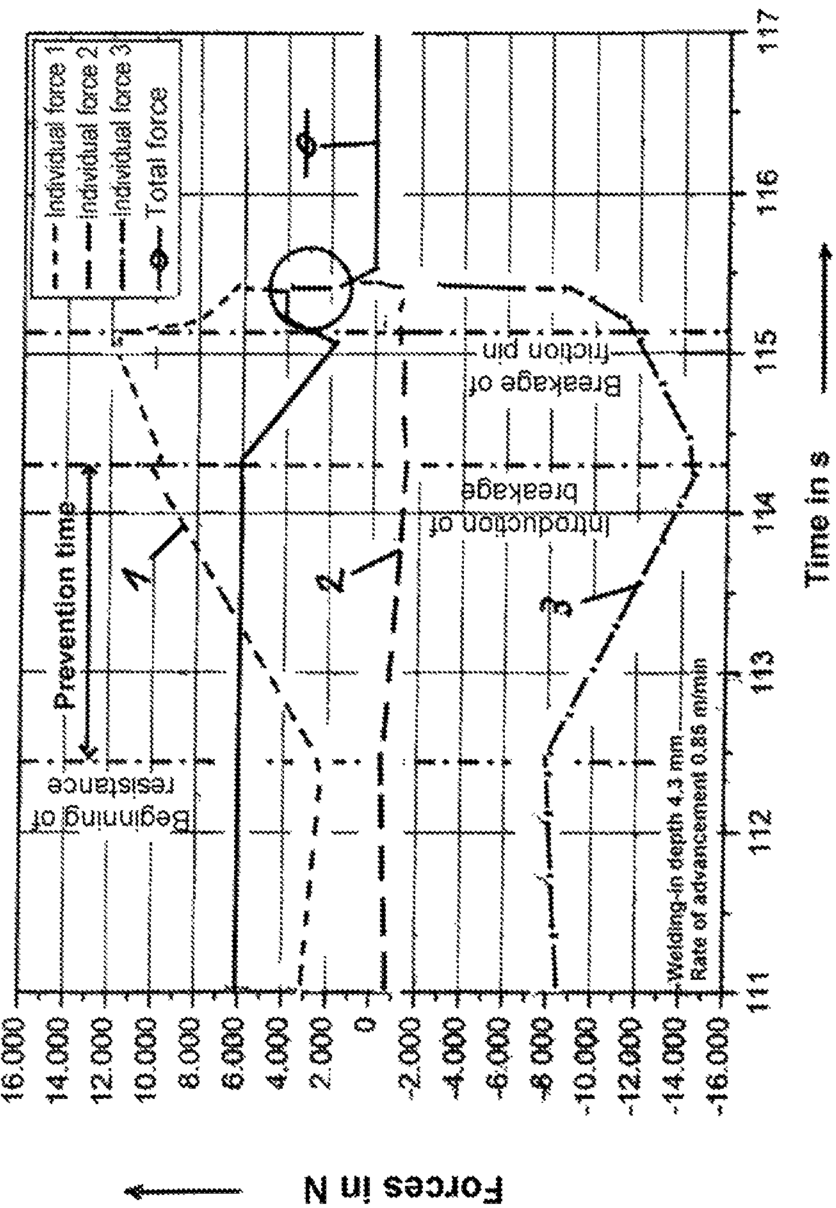
Figure 6:
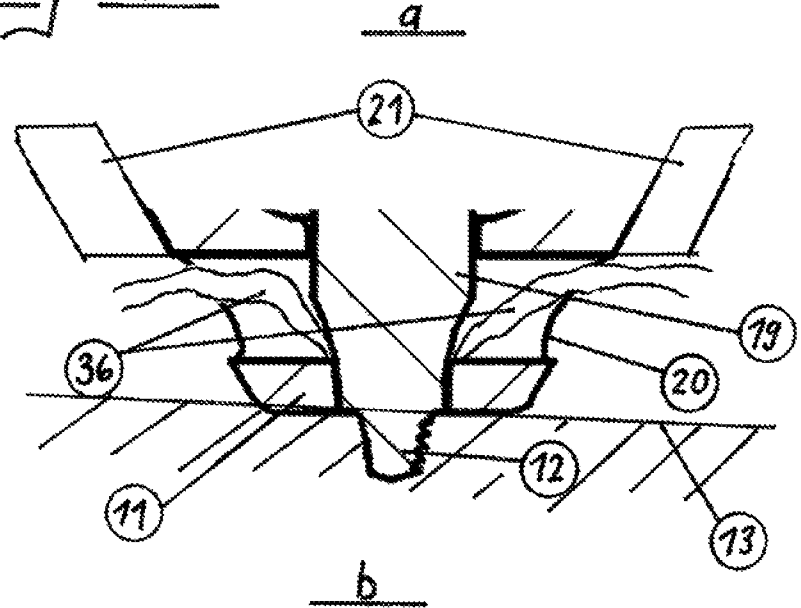
Figure 6:
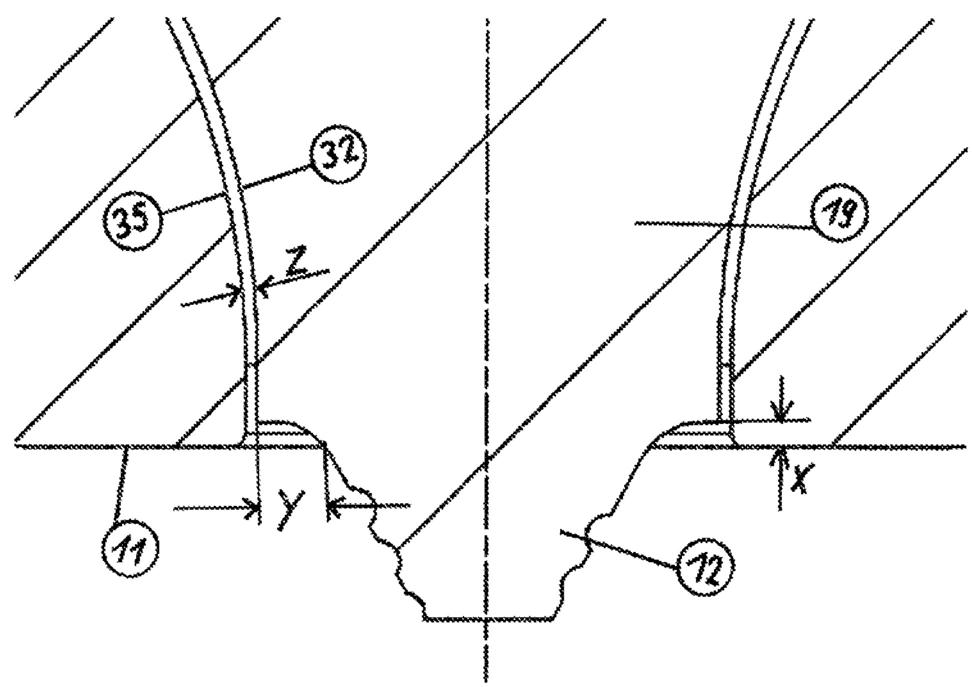

FIG. 2: shows a side view of the tool dome 28 according to the invention FIG. 3: shows a sectional representation of the sensors used according to the invention FIG. 4: shows an overview of the abrasive wear of the welding pin FIG. 5: shows an overview of the time periods until the breakage of the welding pin FIG. 6: shows a representation of the situation in terms of the abrasion of the parts to be joined 13

FIG. 1: shows a side view of a view for friction stir welding.

Here, 1 designates a sensor for measuring the pressure between a fastening flange 2 and a drive 3 for the rotation of the gear mechanism and a tool 3. On the side of the drive 3, the control line for the entire friction welding head is designated by 4. On the underside of the drive 3, a fastening plate 5 for the tool dome flange 6, which carries the tool dome 6, can be seen.

In order to be able to detect the movement of the tool dome 6 by measuring instrumentation, strain gages 8 with temperature compensation are mounted at the circumference of the tool dome 6, fastened at regular intervals in the longitudinal direction. This serves the purpose of counteracting the changes in temperature occurring during welding in the region of the strain gage, and consequently a signal shift. A union nut 9 keeps the tool dome 7 on the central axis of the friction welding head.

The pin tip 12 is guided in the welding shoe 11. The laser measuring sensor 10 shown serves for measuring the distance between the welding shoe 11 and the pin tip 12.

The weld seam 15 applied to the parts to be joined 13 is observed by a camera 14 for checking the weld seam.

FIG. 2: shows a side view of a tool dome 28 according to the invention. The tool dome flange 6 can be seen in detail here, with its connection to the tool dome 7, while the sensors 8 known from FIG. 1, in the form of strain gages, can be seen in the section on both sides of the tool dome 7. Mounted in the central axis of the tool dome 7 is the welding pin 19, which has at the height of the static antenna 16 a device 17 for piezo vertical adjustment for the welding pin 19. Mounted underneath that, the operating pressure acting on the welding pin 19 is measured by means of a sensor 18.

The sensor 22, installed in the same region, in the cross-sectional narrowing shown of the tool receiving cone 28 guiding the welding pin, serves for measuring the axial force acting at this point, the torque and the bending moment.

The signal transmission of the measured values determined by the sensor 22 takes place by way of a signal amplifier 23, which can rotate with the tool receiving cone 28, and a tube antenna.

The reception and passing on of the measured values determined by the sensor 22 takes place by way of a statically fixed antenna 16.

An inductive power supply, the static, primary winding of which is designated by 24 and the movable, secondary winding of which is designated by 25, serves for supplying power to the described measuring systems.

Openings 20 for the material outflow of the smoke residue of the parts to be joined on the welding pin 19 are provided in the region of the pin tip 12, and also a sensor 21 for measuring for measuring the material outflow of the parts to be joined.

The welding shoe 11 guiding the welding pin 19 is held by a union nut 9.

The camera 14 serves for registering and recording the operations during the welding operation.

Apart from the pin tip 12, a structure-borne sound sensor 29, which is directed with its directional effect into the region between the welding pin 19 and the welding shoe 11, is installed in the region of the upper end of the union nut 9. In this respect, reference is made to FIG. 3.

Arranged opposite the laser measuring sensor 10 is an airborne sound sensor 30.

With regard to the exact position, reference is also made here to FIG. 3.

The eddy current sensor 31 can be used for measuring extremely small distances. Its arrangement transversely to the welding direction is advantageous.

FIG. 3 shows a sectional representation in the plane of the laser measuring sensor 10 and the airborne sound sensor 30.

Here it is shown how a deviation of the welding pin 19 with its pin tip 12 from its normal central position within the round hole 27 in the welding shoe 11 can be detected and exactly measured by means of the laser measuring sensor 10 shown and the airborne sound sensor 30 arranged opposite.

In addition, the eddy current sensor 31 known from FIG. 2 and the structure-borne sound sensor 29 act in the gap shown between the welding pin 19 and the inner edge of the welding shoe 11.

The directional arrow 26 indicates the direction of movement of the welding pin 19. In a particular embodiment, a special welding shoe temperature sensor that is not designated any more specifically is provided. After all, in the case of full contact of the rotating pin against the shoulder bore (worst case scenario), there is a temperature increase of approximately 100 degrees C. That is a significant increase in the temperature in comparison with the actual welding operation.

FIG. 4 shows an overview of the abrasive wear of the welding pin up to breakage of the welding pin.

Seen from the outside inward, the concentric circles shown represent the edge of the tool dome 7, the outer delimitation of the welding shoe 11 and the following inner delimitation, not designated any more specifically, of the welding shoe 11. At the circumference of the outer delimitation of the welding shoe 11, designated in the direction of movement of the arrow 26 directed to the right are a sensor 8. These sensors 8, distributed altogether at the circumference of the tool dome 7, can also be taken from FIG. 1 and FIG. 2. The further sensors **8*a* and 8*b* shown in FIG. 4** are designated here as a rear left sensor and a rear right sensor.

Sketched at the inner delimiting line of the welding shoe 11 is the structure-borne sound sensor 29 known from FIG. 3, whereas the eddy current sensor 31, which is likewise known from FIG. 3, can be seen at the outer delimitation of the welding shoe 11, and the airborne sound sensor 30 and the laser measuring sensor 10 is represented to the left and right on a horizontal line.

Eccentric in relation to the circle described, the welding pin 19 with its pin tip 12 is represented with various distance lines, the line 33 representing the ideal line of the distance of the welding pin 19 from the inner delimiting line of the welding shoe 11, the so-called gap zone.

The delimiting lines of the gap zone are represented by 32 and 35 and the critical region that can lead to breakage of the welding pin 19 begins at 34. The shortest distance between the welding pin 19 and the welding shoe 11 is represented as an active zone. The greatest friction between the inner delimitation of the welding shoe 11 and the welding shoe 19 prevails in this region. This distance is dependent on the rate of advancement (arrow 26) of the frictional welding head and the rotational speed of the welding pin 19. The forces occurring laterally thereby are detected by way of the tool dome or rather with the sensors 8, 8*a* and 8*b* fastened on it.

With the following sensors, the further forces occurring are measured:

1. With the laser measuring sensor 10, the distance of the welding pin 19 from the welding shoulder is measured.
2. With the structure-borne sound sensor 29, the vibrations in the welding pin 19 are measured.
3. With the airborne sound sensor 30, the vibrations in the welding shoe 11 and at the tool dome 7 are measured.
4. With the eddy current sensor 31, the direction of the material in the gap between the delimitation 32 and 35 is measured.

The ideal line, at which the pin tip 12 achieves the greatest useful life, is reached with the line 33. It signifies the optimum between optimum advancement and the rotational speed of the tool.

FIG. 5: shows an overview of the time periods until the breakage of the welding pin. Represented on the y-axis of FIG. 4 is the variation of three different individual forces that occur at the pin tip, as a function of time, in the positive and negative directions.

The welding-in depth is 4.3 mm and the rate of advancement of the pin tip is 0.85 m/mm. The beginning of the measurable resistance of the pin tip can be seen in the left marking line; after approximately 1.7 seconds, the prevention time ends and then a further approximately 0.8 seconds pass until there is a breakage.

In this time period, the machine controller can provide relief, whereby an elastic "springback" of the pin is achieved. Therefore, no disadvantageous damage occurs.

After that, after this period of time, permanent damage then occurs.

FIG. 6 shows a representation of the situation in terms of the abrasion of the parts to be joined 13.

In FIG. 6*a*, the welding shoe 11 with the pin tip 12 and the welding pin 19 in the middle over, or in, the part to be joined 13 can be seen in cross section, two parts of the sensor 21 lying opposite one another detecting the at the openings 20 the abrasion 36 (amount, intensity and velocity) of the smoke residue emerging at the welding pin 19.

FIG. 6*b* shows the pin tip 12 of the welding pin 19 in the welding shoe 11.

The gap zone 32 represented (cf. FIG. 3) of the pin-side delimitation and the gap zone 35 of the welding-shoe-side delimitation define the distance Z, i.e. a maximum of 0.8 mm. In this width, the abrasion 36 can flow away.

The dimension X is the dimension by which the remaining shoulder can enter the welding shoe 11.

The remaining shoulder Y is of importance, in order that the material to be welded receives the necessary temperature in order to gain sufficient plasticity to be able to flow through the gap Z. At too low a temperature, a buildup occurs, and the pin shaft 19 is damaged.

The dimension X (0.01 to 0.1 mm) is respectively set according to the material (alloy). The remaining shoulder generates heat, which also has an influence on the smoothing operation by the welding shoe 11 on the finished weld seam.

LIST OF DESIGNATIONS

1 Sensor for measuring pressure between the flange 2 and the drive 3
2 Fastening flange for a robot arm or a gantry bridge
3 Drive with gear mechanism for the tool
4 Control line for the friction welding head
5 Fastening plate for the tool dome flange
6 Tool dome flange
7 Tool dome
8 Sensor on the tool dome 7 (strain gage)
8*a*: rear left sensor. 8*b*: rear right sensor
9 Union nut
10 Laser measuring sensor of the distance of welding pin and welding shoe
11 Welding shoe
12 Pin tip
13 Parts to be joined
14 Camera for checking the weld seam
15 Weld seam
16 Static antenna
17 Piezo vertical adjustment for the welding pin 19
18 Sensor for measuring the vertical pressure of the welding pin 19
19 Welding pin
20 Openings for the outflow of material of the smoke residue of the parts to be joined on the welding pin 19
21 Sensor for measuring the outflow of material of the parts to be joined
22 Sensor for the tool receiving cone (for example strain gage)
23 Sensor signal amplifier and rotor antenna
24 Inductive power supply, secondary winding
25 Inductive power supply, primary winding
26 Direction of movement of the welding pin
27 Round hole for the passing through of the welding pin 26 in the welding shoe 11
28 Tool receiving cone
29 Structure-borne sound sensor
30 Airborne sound sensor
31 Eddy current sensor
32 Delimitation of the gap zone on the side of the welding pin 19
33 Ideal line of the distance of the welding pin 19 from the welding shoe 11
34 Beginning of the critical region of the gap zone
35 Delimitation of the gap zone on the side of the welding shoe 11
36 Material abrasion of the parts to be joined 13

The inventions claimed is:

1. A device for avoiding an interruption of the welding process during friction stir welding, with the following features:

a) at least three elongated sensors (8), oriented at an angle of 120 degrees to one another, on the longitudinal sides of a wedge-shaped tool dome (7), the tool dome (7) guiding a welding pin (19) by means of a tool receiving cone (28) and a welding shoe (11), and the elongated sensors (8) being designed for determining force, pressure and travel, b) a cone constriction in the lower region of the tool receiving cone (28), which serves for receiving a sensor (22) for detecting an axial force, a torque and a bending moment at the welding pin (19), c) a piezo vertical adjustment for the welding pin (19), d) an arrangement of a laser measuring sensor (10) in the region of the welding shoe (11), which passes over a round hole (27) in the passing-through region of the pin tip (12), an airborne sound sensor (3) being arranged opposite the laser measuring sensor (10), and a welding shoe temperature sensor being provided, e) a sensor signal amplifier (23), with a rotor antenna for receiving, amplifying and passing on all of the measured values detected, these measured values being passed on to a machine controller by a static antenna (16), f) an inductive power supply system for supplying the measuring system from a moving secondary winding (24) and a fixed primary winding (25).

2. The device as claimed in claim 1, wherein a structure-borne sound sensor (29), which is directed with its directional effect into the region between the welding pin 19 and the welding shoe 11, is installed in the region of the upper end of the union nut (9).

3. The device as claimed in claim 1, wherein an eddy current sensor 31 is used for measuring extremely small distances, this sensor being arranged transversely to the welding direction.

4. The device as claimed in claim 1, wherein a temperature sensor is provided for detecting the temperature of the welding shoe 11.

5. A method for avoiding an interruption of the welding process during friction stir welding, in particular breakage of the friction pin, with the following features:

a) a device compromising a system of elongated sensors (8) for determining force, pressure and travel of a rotating tool dome (7), guiding a welding pin (19), is supported by a cone constriction in the lower region of a tool receiving cone (28), which serves for detecting an axial force, a torque and a bending moment at a welding pin (19), sensors for detecting bending and a temperature of the welding pin (19) provide information about the state of the welding pin (19) before any damage to the welding pin occurs, wherein at least three of the elongated sensors (8) are oriented at an angle of 120 degrees to one another, on the longitudinal sides of a wedge-shaped tool dome (7), the tool dome (7) guiding a welding pin (19) by means of a tool receiving cone (28) and a welding shoe (11), and the elongated sensors (8) being designed for determining force, pressure and travel, and wherein the device further comprises a cone constriction in the lower region of the tool receiving cone (28), which serves for receiving a sensor (22) for detecting an axial force, a torque and a bending moment at the welding pin (19).

6. The device as claimed in claim 1, wherein the interruption of the welding process to be avoided is breakage of the friction pin.

* * * * *